Oct. 29, 1935.  F. C. NARVESEN ET AL  2,018,735
GYROVERTICAL
Filed March 5, 1934  2 Sheets-Sheet 1
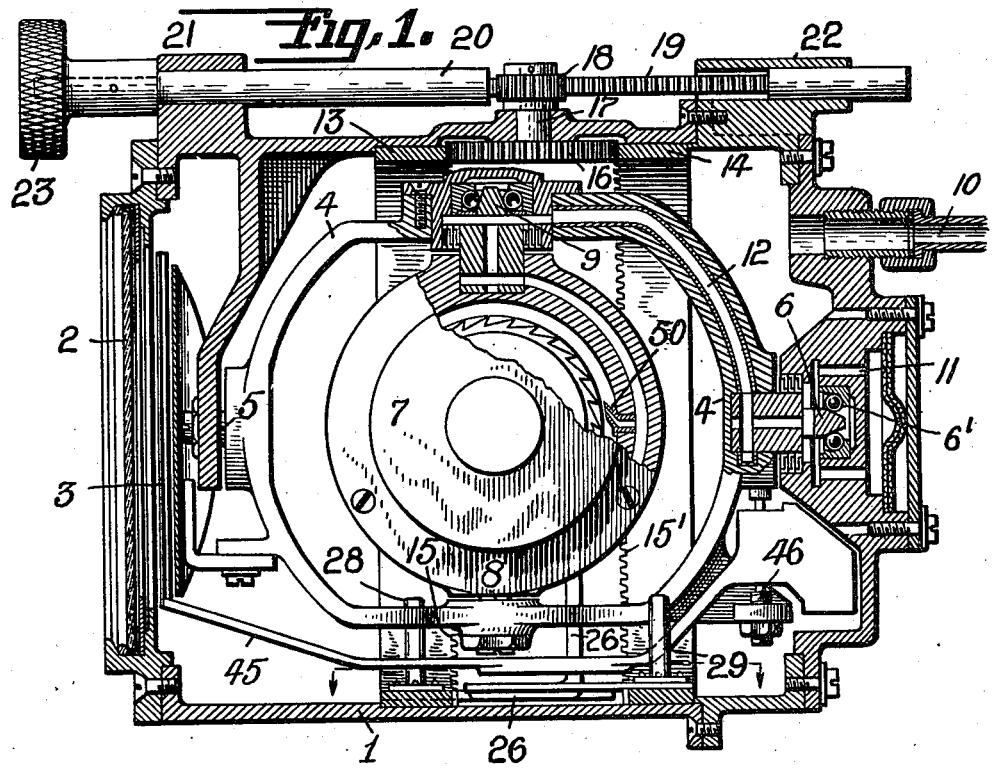
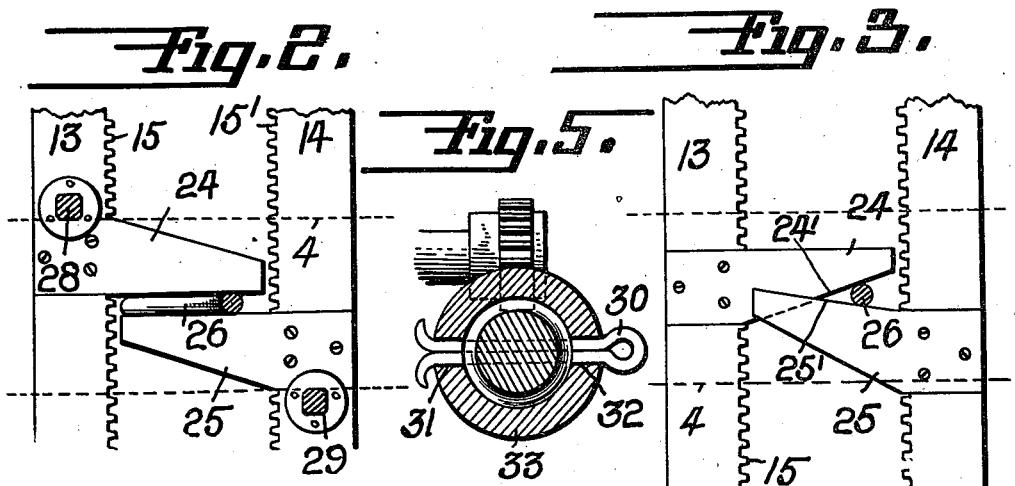
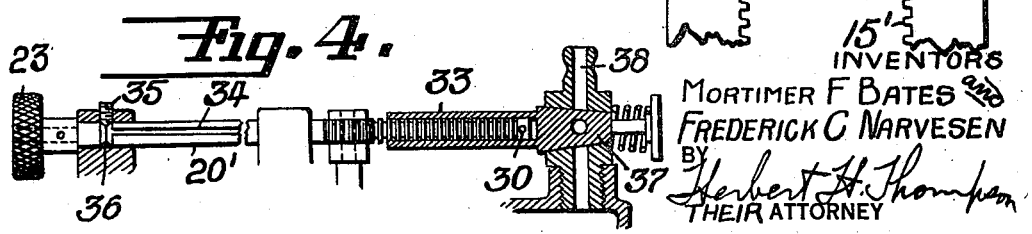
INVENTORS
MORTIMER F BATES
FREDERICK C NARVESEN
BY Herbert H. Thompson
THEIR ATTORNEY

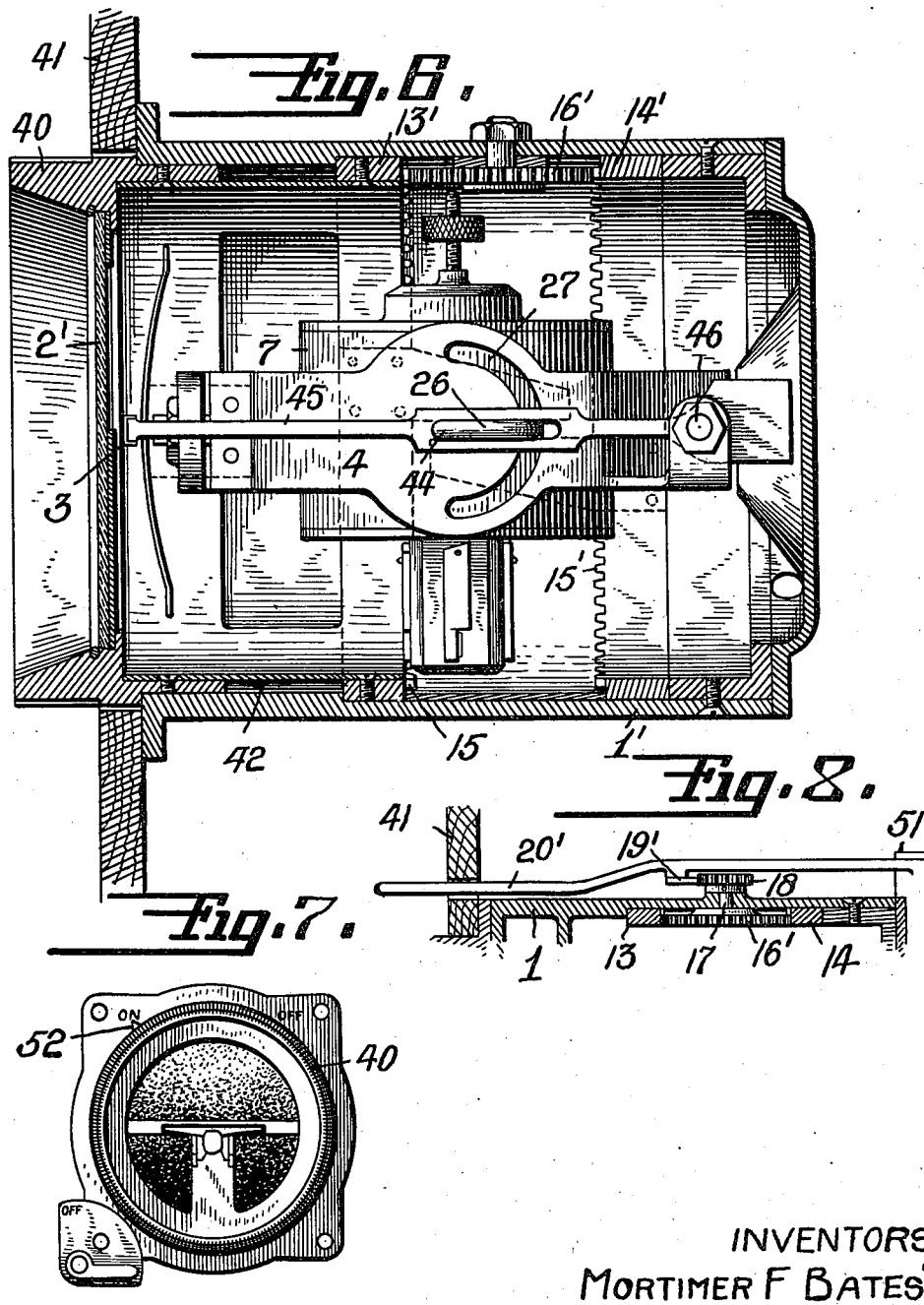

Patented Oct. 29, 1935

2,018,735

UNITED STATES PATENT OFFICE 2,018,735

GYROVERTICAL

Frederick C. Narvesen, East Rockaway, and Mortimer F. Bates, Brooklyn, N. Y., assignors to Sperry Gyroscope Company, Inc., Brooklyn, N. Y., a corporation of New York Application March 5, 1934, Serial No. 714,124

8 Claims. (Cl. 74—5)

This invention relates to gyroscopic artificial horizons or gyro verticals especially adapted for aircraft and more especially to means for centralizing or caging the same at will. While such instruments remain vertical during normal flight, unusual maneuvers may cause the same to strike stops and damage the same. Therefore it is desirable to lock or cage the same if unusual maneuvers, such as looping the loop and barrel rolling, are contemplated. It is also found desirable to lock the same during shipping. The problem of providing a satisfactory cage is complicated by the fact that such gyroscopes are usually enclosed in an air-tight casing from which the air is withdrawn.

Referring to the drawings, showing several forms our invention may assume:

Fig. 1 is a plan view of an artificial horizon constructed according to our invention, the outer case being shown in section.

Fig. 2 is a detail side elevation of a portion of the caging device.

Fig. 3 is a similar view of a modified form of caging device.

Fig. 4 shows a modified operating handle which is also adapted to shutting off the air supply to the gyro.

Fig. 5 is a detailed sectional view thereof.

Fig. 6 is an elevation of a modified form of caging device, the outer case being in section.

Fig. 7 is a face view of the same upon a reduced scale.

Fig. 8 is a detail showing another modified method of operating the centralizing means of Fig. 1.

The gyro-vertical or artificial horizon is shown as enclosed within an outer air-tight casing 1 having a forward window 2 through which the horizon bar 3 is visible. The gyroscope is mounted within said casing by means of a gimbal ring 4 pivoted on the fore and aft axis 5—6 within said casing. The rotor bearing frame or casing 7 of the gyroscope is shown as pivoted within the gimbal on transverse axis 8—9. The gyro rotor within the casing may be spun by any suitable means, such as an air jet. As shown, air is continuously exhausted from the casing 1 through pipe 10 by means of a suitable air pump (not shown) and air enters the gyroscope through apertures 11 in the bearing 6' supporting the trunnion 6, and thence through the hollow trunnion 6 through passage 12 in the gimbal and thence through hollow trunnion 9 to within the gyro case, where a jet (or jets) 50 is provided to spin the rotor, as is well understood in the art.

For centralizing the gyroscope we have shown a pair of rings 13, 14 rotatably mounted within the casing 1 and having gear teeth 15 and 15' on the inner edges thereof. Said teeth mesh with the gear 16 secured to a shaft 17 journalled in the side of said casing and having a pinion 18 on the outer end thereof. Said pinion is shown as meshing with the rack teeth 19 formed in a push rod 20 slidably mounted in spaced bearings 21 and 22 in said casing. Said rod is shown as provided with an operating knob 23. Said rings 13 and 14 are provided with outwardly projecting fingers 24 and 25 at one side. Said fingers are adapted to engage, when in the full line position in Fig. 2, a pin 26 projecting from the gyro casing 7 through an annular slot 27 (Fig. 6) in the gimbal ring 4. Said pin extends from a point at one side of the axis 8—9 so that when the same is engaged it locks the gyroscope about both axes 4—5 and 8—9 and brings it to a central position. The same pin may be used as the pin normally employed to move the horizon bar 3 up and down, the pin 26 passing through a slot 44 in the long lever 45 pivoted on the gimbal ring 4 at 46. To supplement the action of the fingers 24 and 25, pins 28 and 29 may also be secured to the rings 13 and 14, respectively, which engage the top and bottom, respectively, of the gimbal ring 4. If desired, the engaging surfaces of said fingers 24 and 25 may be inclined as shown at 24' and 25' in Fig. 3, so as to assist in the centralizing action.

Figs. 4 and 5 show how the setting knob of Fig. 1 may be made use of to also turn on and off the air supply for the gyroscopes. In these figures the push rod 20' is provided with a cross pin 30 which engages longitudinally extending slots or bifurcations 31, 32 in the inner end of sleeve 33 extending from valve 37. Rod 20' may also be provided with a keyway 34 with which a set screw 35 engages so as to prevent the rod 20' from being turned except when it is pushed into its innermost position, at which time the gyro is caged. In order to permit the rod 20' being turned at that time the keyway 34 merges into an annular slot 36 in said rod. Therefore, by turning the rod at that time the sleeve 33 is turned, thus turning the valve 37 to shut off the outlet from the casing through passageway 38, which communicates with the air pump. By some such means the accidental shutting off of the air supply may be prevented, since it can only be shut off after the gyro is caged.

In the form shown in Figs. 6 and 7 the rings 13' and 14' are rotated by means of a knurled ring 40 which projects through the instrument board 41 and carries the glass front window 2'. Said ring is rotatably mounted in the forward portion of the casing 1' and has secured thereto a sheet metal sleeve 42, to the inner end of which is secured the ring 13'. Therefore, by rotating the ring 40 the ring 13' is also rotated, and by providing a gear 16' such as gear 16 in Fig. 1 between rings 14' and 13', the latter will be rotated in the opposite direction, so as to act as shown in Figs. 1 and 2, upon pin 26 extending from the gyro casing. Said ring 40 may be provided with an index 52 showing whether the gyroscope is on or off, that is, locked. In both cases, said pin 26 is shown as bent inwardly at its outer end to a point beyond the axis 8—9 to increase the surface engaged by the caging fingers, and so as to act as a positive lock by preventing rotation of the gyroscope about rod 26 as a center.

Still another method of actuating the caging device is shown in Fig. 8. This method is very similar to that shown in Fig. 1, except that the pinion 18 on the shaft of the gear 16' is rotated in this instance by means of a long lever 20' pivoted at 51 on the case and extending at its forward end through a slot in the panel 41. Said lever is shown as having a segmental annular gear 19' secured thereto, which meshes with the pinion 18 so as to revolve the same when the handle is moved, as will be readily apparent.

In accordance with the provisions of the patent statute, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. A caging device for gyro-verticals comprising the combination with a gyro rotor bearing casing supported for freedom about two horizontal axes, of a pin projecting therefrom from a point to one side of both of said axes, a pair of rings around said gyro-vertical, a member projecting from each and adapted to engage said pin from opposite sides, and means for oppositely turning said rings.

2. In a gyro-vertical, an outer casing enclosing the same, a gyroscope universally pivoted thereon on two normally horizontal axes, a pair of rings rotatably mounted within said casing, means operable from without said casing for oppositely rotating said rings, and means on said rings for engaging said gyroscope to centralize the same about both axes.

3. In a gyro-vertical, an outer casing enclosing the same, a gyroscope universally pivoted thereon on two normally horizontal axes, a pair of rings rotatably mounted within said casing, a forward part extending beyond and rotatably mounted within said casing, an operating connection between both of said rings and said part to oppositely rotate the rings upon movement of said part, and means on said rings for engaging said gyroscope at a point spaced from both of said axes to centralize and lock the gyroscope.

4. A caging device for gyro-verticals as claimed in claim 1 in which the eccentric pin as the portion thereof engaged by said engaging members is bent inwardly toward the adjacent axis of rotation of the bearing casing.

5. A gyro-vertical as claimed in claim 2 in which the engaging means comprises a pair of oppositely projecting arms having oppositely inclined engaging surfaces.

6. In a gyroscopic instrument for aircraft, a rotor, a means for spinning the same, a rotor bearing casing supported for freedom about at least two axes other than the rotor spin axis, an outer casing enclosing said gyroscope, a cage for centralizing said rotor bearing casing about both of said two axes with respect to the outer casing, and a common means operable from without said casing for operating said cage and shutting off said spinning means.

7. In a gyroscopic instrument for aircraft, a rotor, a means for spinning the same, a rotor bearing casing supported for freedom about at least two axes other than the rotor spin axis, an outer casing enclosing said gyroscope, means for shutting off said spinning means, means for caging said bearing casing about both of said two axes with respect to the outer casing and means associated with said two last named means for preventing the operation of said shut off means for the spinning means unless the caging means is first operated.

8. In an air-spun gyroscopic instrument for aircraft, a rotor, means for supplying air under pressure thereto for spinning the same, a rotor bearing casing supported for freedom about at least two axes other than the rotor spin axis, an outer casing enclosing said gyroscope, a cage for centralizing said rotor bearing casing about both of said two axes with respect to the outer casing, a shut off valve for the air supply, and a common means operable from without said casing for caging said rotor bearing casing and operating said shut off valve.

MORTIMER F. BATES.
FREDERICK C. NARVESEN.